Oct. 14, 1930.  H. E. HUND  1,778,389
MECHANISM FOR MAKING CONCRETE PIPE
Filed Dec. 30, 1927  10 Sheets-Sheet 2

Inventor
Henry E. Hund
By Rex Frye
Attorney

Oct. 14, 1930.  H. E. HUND  1,778,389
MECHANISM FOR MAKING CONCRETE PIPE
Filed Dec. 30, 1927  10 Sheets-Sheet 3

Inventor
Henry E. Hund
By Rex Frye.
Attorney

Oct. 14, 1930.　　　　　H. E. HUND　　　　　1,778,389
MECHANISM FOR MAKING CONCRETE PIPE
Filed Dec. 30, 1927　　　10 Sheets-Sheet 4

Inventor
Harry E. Hund
By Rex Frye.
Attorney

Fig. 10.

Oct. 14, 1930.  H. E. HUND  1,778,389
MECHANISM FOR MAKING CONCRETE PIPE
Filed Dec. 30, 1927   10 Sheets-Sheet 10

Fig. 11.

INVENTOR.
Henry E. Hund
BY
Rex Frye
ATTORNEY.

Patented Oct. 14, 1930

1,778,389

UNITED STATES PATENT OFFICE

HENRY E. HUND, OF DETROIT, MICHIGAN, ASSIGNOR TO DETROIT HUME PIPE COMPANY, OF DETROIT, MICHIGAN, A CORPORATION OF MICHIGAN

MECHANISM FOR MAKING CONCRETE PIPE

Application filed December 30, 1927. Serial No. 243,594.

This invention relates to an improved mechanism for manufacturing articles of concrete, or other composite materials, and more particularly to the means for supplying the concrete, or like material, to the molds used in forming the concrete articles.

One of the objects of my invention is the provision of means for delivering concrete, or like material, equably throughout an elongated mold, whereby the concrete will be uniformly distributed throughout the mold. For example, in the manufacture of concrete pipe sections formed by rotating the molds after the concrete has been disposed therein to enable the use of centrifugal force in spreading the concrete within the mold, it has been found that my improved means deposits the concrete over the entire length of the mold so that after rotation of the mold the pipe will be of substantially uniform density throughout.

Another object of my invention is the arrangement of a feed chute adapted to receive concrete from a suitable hopper and deliver such concrete over the entire length of a mold, as by revolving the chute to dump the contents after the chute has been introduced into a hollow mold, or moving the chute back and forth within the mold while the mold is being rotated.

A further object of my invention is the arrangement of mechanism for depositing concrete, or like material, whereby the concrete will be fed to the end of a chute at various desired speeds, the feed of the concrete being driven from a motor also connected to drive a vehicle on which my improved mechanism is mounted.

Other objects and advantages will be apparent from the following description, wherein reference is made to the accompanying drawings illustrating preferred embodiments of my invention and wherein similar reference numerals designate similar parts throughout the several views.

Figure 3:
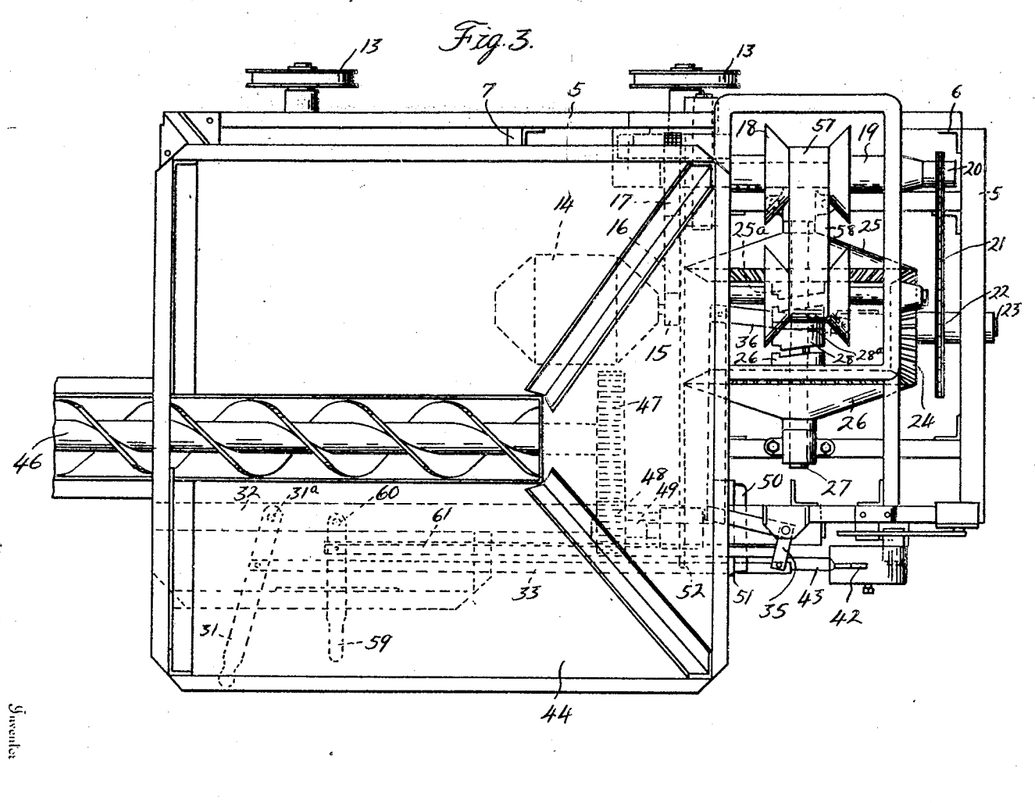
Figure 3 is a plan view thereof.
Figure 4:
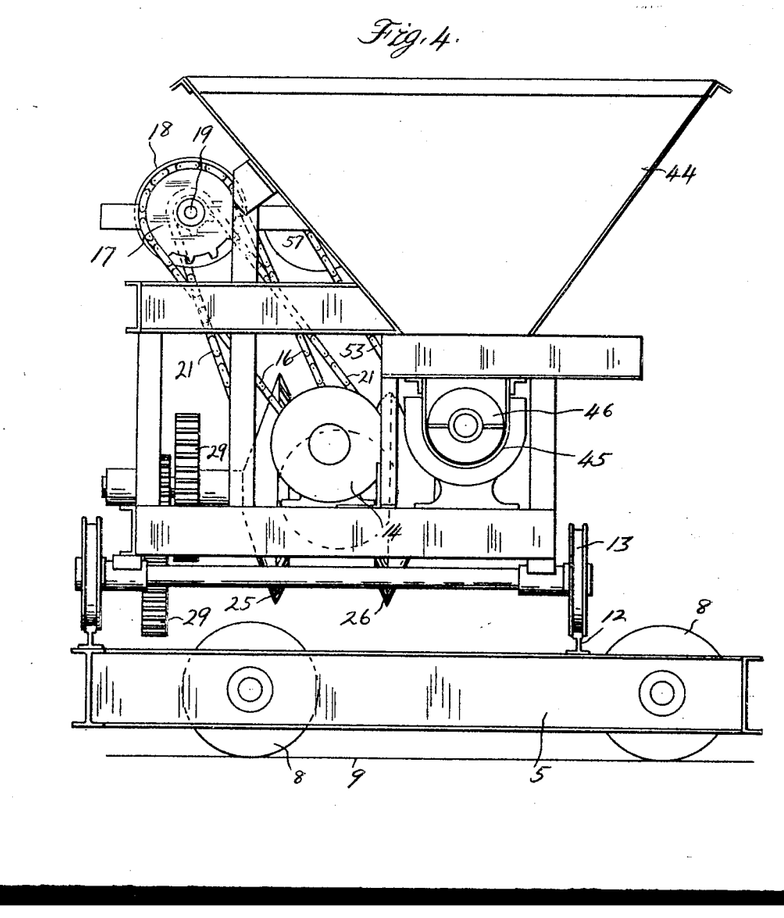
Figure 4 is a front elevation thereof.

Referring now to the drawings, the numeral 5 designates a truck or vehicle on which my improved feed mechanism is adapted to be mounted. The truck 5 is preferably formed of side and end rails of channel iron or other suitable members and suitably braced by corner brackets 6 and cross bars 7 (note Figure 3). The truck 5 preferably carries a plurality of flanged wheels 8 fitting over permanent tracks 9 or the like, preferably arranged adjacent a plurality of spaced spinning mechanisms 10, each adapted to impart rotation to cylindrical molds 11 for making concrete pipe sections or the like. This arrangement permits the use of a single feed mechanism with a battery of concrete pipe molds, the truck 5 being moved along the permanent rails 8 to each of the molds as desired.

Carried by the truck 5 are a pair of rails 12 for the reception of flanged wheels 13 journaled upon the frame-work of my improved feed mechanism, as hereinafter described. The rails 12 preferably run at right angles to the permanent rails 9 on which the wheels 8 of the truck move, this arrangement permitting the movement of the truck and feed mechanism in one direction and the feed mechanism upon the truck in directions perpendicular thereto, as when the concrete is being fed by my improved feed mechanism into an elongated pipe section mold. Means are provided for driving one or more pairs of the wheels 13 from a motor 14 mounted upon the frame-work of my improved feed mechanism. In the embodiment illustrated in Figures 1–6 I have shown an arrangement for driving the wheels 13 consisting of a sprocket wheel 15 on the shaft of the motor 14, a chain 16 connecting such sprocket wheel with a sprocket wheel 17 on the shaft of one spool 18 of a Reeves transmission gear, the axle 19 on which the sprocket 17 is mounted also carrying a sprocket 20 connected by a chain 21 with the sprocket wheel 22 fixed upon the stub shaft 23 carrying a bevel pinion 24. The bevel pinion 24 meshes with both of the bevel gears 25 and 26 so as to continuously drive them in opposite directions (note Figures 2 and 3), the bevel gears being loosely journaled around the transverse shaft 27 and carrying a clutch face 25$^a$ and 26$^a$ respectively for cooperation when desired with the slidable clutch member 28 splined upon the transverse shaft 27. I have shown herein clutch faces of the crown or jaw type, but it is to be understood that any suitable type of clutch can be used. When the slidable clutch member 28 is moved into engagement with one of the bevel gears 25 or 26, the transverse shaft 27 will be rotated to set in motion a train of reducing gears 29, suitably arranged with one gear of the train fixed upon the axle 30 carrying a pair of flanged wheels 13. Obviously any suitable arrangement of reduction gears may be utilized to reduce the speed from the motor to the wheels 13 to the desired extent and suitable changes in the dimensions and number of teeth on the several sprocket wheels utilized may be made to aid in securing the desired speed reduction between the motor and the wheels 13.

Figure 1:
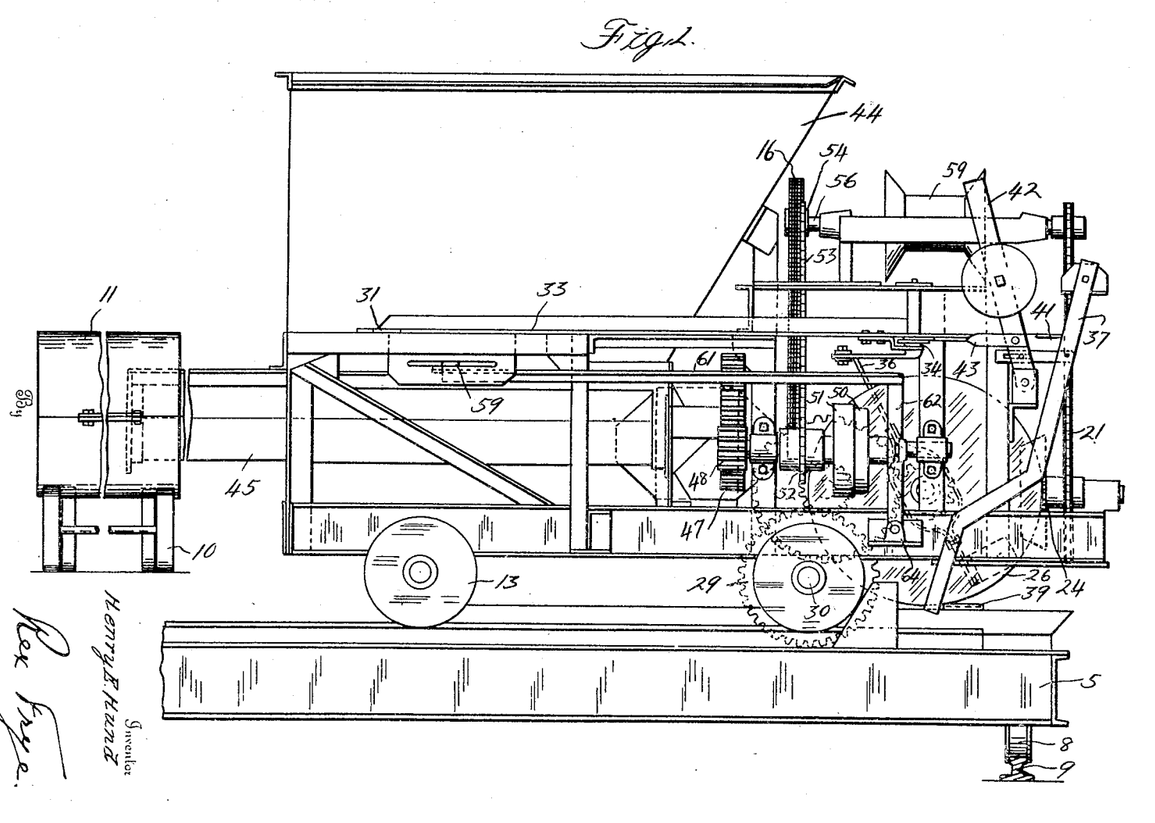
Figure 1 is a side elevation of my improved feed mechanism.
Figure 2:
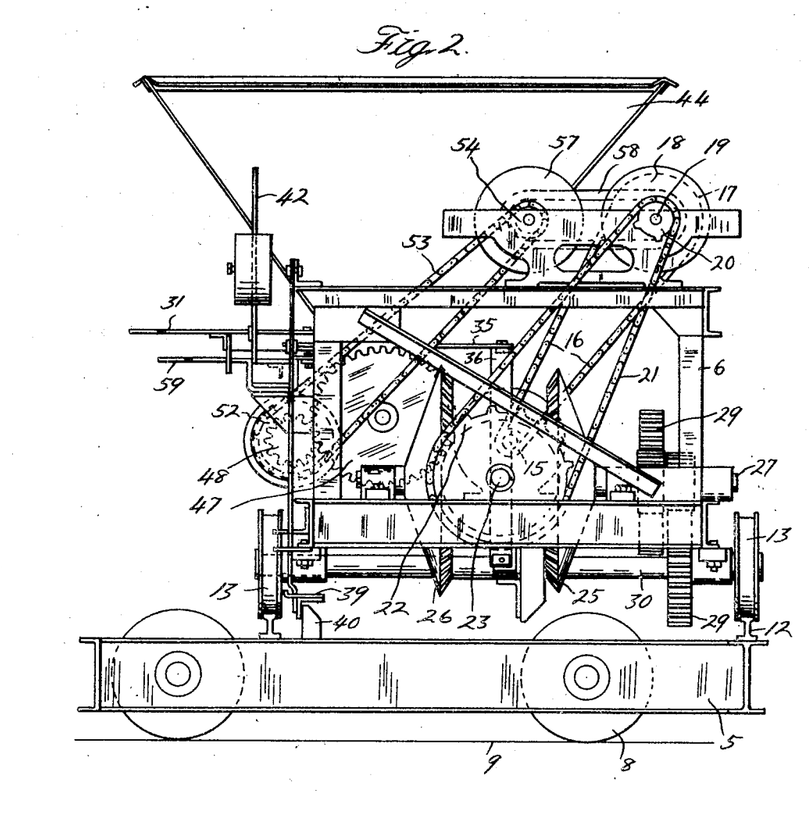
Figure 2 is a rear elevation thereof.
Figure 5:
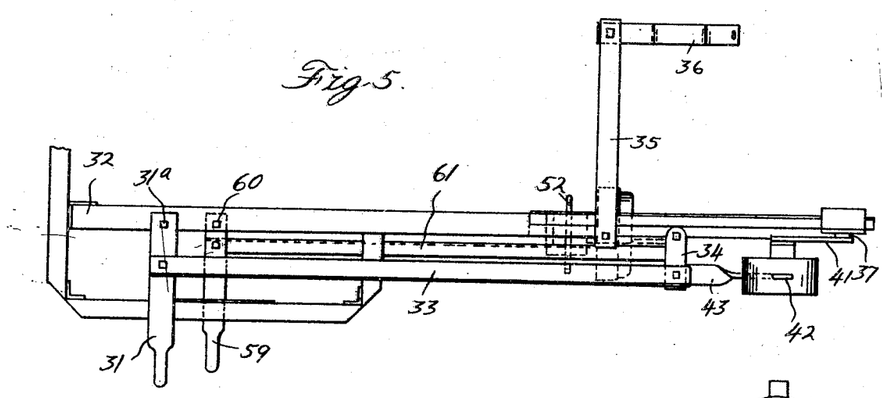
Figure 5 is a detail plan view of the lever mechanisms for shifting the clutches for controlling the operation of the feed chutes and reversing the direction of the truck on which my improved feed mechanism is mounted.
Figure 6:
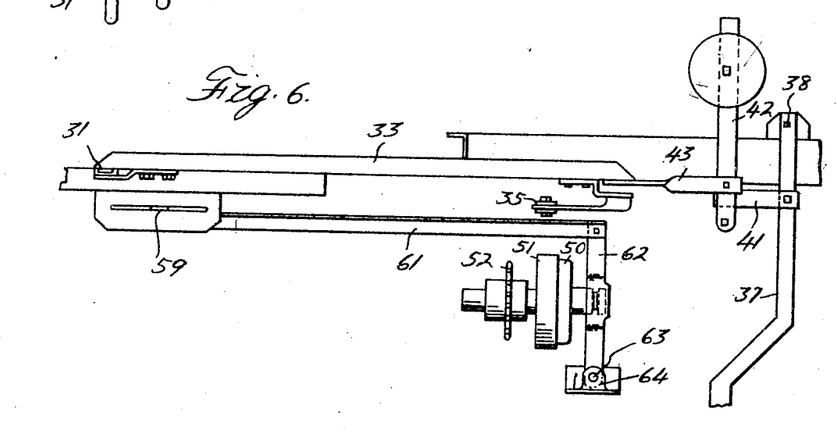
Figure 6 is a side elevation of such lever mechanisms.

The lever mechanism for shifting the slidable clutch member 28 into and out of engagement with the clutch faces 25$^a$ and 26$^a$ of the bevel gears is best shown in Figures 1, 5 and 6. A hand lever 31 is pivoted adjacent one extremity, as at 31$^a$, upon a side bar 32 of the frame-work of my improved feed mechanism while a long link 33 is pivotally connected at its extremities to the hand lever 31 and a bell crank lever 34 also pivoted upon the frame-work of the machine and having its opposite extremity pivotally connected with a short link 35 extending transversely of the machine and connected at its opposite extremity to a yoke carrying bar 36, the yoke of which carries pins extending into the circumferential groove 28$^a$ arranged substantially centrally in the slidable clutch member 28. By virtue of this arrangement the movement of the hand lever 31 from one extreme position to its opposite extreme position will shift the slidable clutch member 28 out of engagement with the clutch face of one bevel gear and into engagement with the clutch face of the other bevel gear, thereby serving to reverse the direction of movement of the reduction gearing 29 and wheels 13. The desired alternate swinging of the hand lever 31 may be secured by an operator standing upon the truck, whereby the truck may be permitted to move in either direction as far as desired. I also provide automatic means for shifting the clutch member 28 alternately into and out of engagement with the clutch faces of the bevel gears 25 and 26 whenever it is desired to secure reciprocating movements of my improved feed mechanism, as when the feed trough is moved back and forth within a revolving pipe section mold while the concrete is being deposited therein. Such automatic shifting mechanism is best shown in Figures 1, 2 and 6 and comprises a trip lever 37 pivoted adjacent its upper end, as at 38, upon the frame-work of the machine and extending downwardly into position to engage a pair of stop members 39 adjustably mounted upon an elongated bar 40 carried by the truck 5, the trip lever 37 being connected intermediate its ends by a link 41 with a counter-weighted lever 42 also pivoted upon the frame-work and connected by the link 43 with the bell crank lever 34. This arrangement permits the alternate swinging of the bell crank lever 34 and through it the several parts herein above described, in connection with the hand operating shifting mechanism whenever the trip lever 37 engages one of the stops 39 during the travel of the machine along the rails 12. The stops 39 are positioned so that the trip lever will engage them slightly in advance of the desired extent of movement of the machine in each direction, the continued movement of the machine after the engagement of the trip lever with a stop 39, serving to throw the trip lever from its then position to its opposite extreme position, thus swinging the counter-weighted lever 43 from one of its extreme positions to the other end and so serving to shift the slidable clutch member 28 from one of its extreme positions to the other through the medium of the bell crank lever 34, short link 35 and yoke bar 36. The weight of the counter-weighted lever 42 will serve to keep the several elements of the shifting mechanism in one extreme position until the trip lever is again thrown or the hand lever 31 moved by the operator.

The means for supplying concrete or other plastic material to the pipe section or other article being made will now be described. A hopper 44 is mounted upon the forward portion of the truck and preferably has its sides sloping to a substantially centrally arranged trough 45 leading forwardly from the bottom of the hopper for a suitable distance in advance of the truck. In the trough 45, which preferably is formed with a semi-cylindrical bottom portion, is arranged a feed screw 46, the shaft of which is journaled in suitable bearings in the ends of the trough and extend through the rear extremity of the trough. The projecting rear portion of the feed screw shaft carries a gear wheel 47 (note Figures 2 and 3) meshing with a pinion 48 fixed upon a stub shaft 49 journaled in suitable bearings upon the framework of my improved feed mechanism and also carrying the driven portion 50 of an external sleeve clutch. The driving portion 51 of such clutch is mounted upon a sleeve rotatable upon the central portion of the stub shaft 49, a sprocket gear 52 being also fixed upon the rotatable sleeve. The sprocket gear 52 is connected by the chain 53 with a sprocket pinion 54 fixed upon the axle 56 of that portion of the Reeves transmission mechanism 57 opposite to that which carries the sprocket 20 for driving the wheels 13 of the truck. The Reeves transmission mechanism 57 is utilized herein as representative of a suitable type of variable speed transmission mechanism, but it is to be understood that other suitable variable speed transmission mechanisms may be substituted therefor. The Reeves mechanism herein employed is preferably one having a variable speed transmission ratio of substantially 6 to 1.

When the axle of the Reeves transmission mechanism carrying the sprocket gear 20 is driven from the motor 14 through the chain 16, its movement is transmitted to the axle 56 through a belt 58 passing between spools having flaring end portions arranged on the respective axles. By moving the ends of each spool toward or away from each other, the speed of the axle 56 may be varied at will, the belt engaging portions on the spool ends radially closer to or further from the axles.

From the above it will be apparent that as long as the motor 14 is rotating, the axle 56 and sprocket wheel 54 carried thereby will also be rotating at a desired speed, and transmitting the rotation through the chain 53 to the driving portion 51 of the clutch controlling the rotation of the feed screw 46. When the driven portion 50 of the clutch is out of engagement with the driving portion 51 thereof, the feed screw is stationary, but whenever it is desired to rotate the feed screw in order to deliver concrete or other plastic material from the hopper 45 to a mold 11 or the like, it is only necessary to slide the driven portion 50 of the clutch into engagement with the driving portion 51. As best illustrated in Figures 1, 5 and 6, a hand lever 59 is pivotally mounted, as at 60, upon the frame-work, preferably below and at one side of the hand lever 31 hereinbefore described. One extremity of a long link 61 is pivotally connected to the hand lever 59 intermediate its ends, and the opposite extremity of the link 61 is pivotally connected with the upper extremity of a substantially vertically arranged lever 62, the lower extremity of which is pivoted, as at 63, upon a bracket 64 mounted upon the frame-work. Intermediate its ends the lever 62 is formed with a yoke portion carrying pins adapted to extend within a circular groove on the hub portion of the driven member 50 of the clutch. When the hand lever 59 is rocked, the movement is transmitted through the link 61 to the vertical lever 62, rocking the vertical lever in accordance with the direction of movement of the handle lever 59 to slide the driven portion 50 of the clutch toward or away from the driving portion 51 thereof. The driven portion 50 is splined or otherwise suitably secured to the stub shaft 49 so as to permit such sliding movement of the clutch member while enabling the rotation of the stub shaft through the driven portion 50 of the clutch whenever the driven portion is in engagement with the driving portion 51.

The operation of the embodiment illustrated in Figures 1–6 will now be described. The truck is moved along the rails 9 until the feed trough 45 is in proper position to deliver concrete or other suitable material from the hopper 44 to a desired one of a series of spinning mechanisms 10, on which may be mounted a mold for forming a concrete pipe section or other suitable device. When so positioned, upon the movement of the truck on its tracks 12, which are at right angles to the tracks 9, the feed trough will be moved within the mold 11 in accordance with the extent and direction of movement imparted to the wheels 13 of the truck through the mechanism hereinbefore described for advancing or retracting my improved feed mechanism. The concrete or other plastic material for forming the desired article in the mold 11 is preferably mixed preliminary to introduction in the hopper 44, and is formed with sufficient moisture to render the mix sufficiently plastic to enable its ready passage through the feed trough 45. However, it is not necessary that the mix be in an entirely fluid condition, because the spiral blades of the feed screw 46 will force the material then in the feed trough toward the forward extremity of the trough whenever the feed screw is rotated through the mechanism hereinbefore described. After the introduction of the prepared plastic material into the hopper 44 and the positioning of the forward extremity of the feed trough 45 within or adjacent to the mold 11, my improved feed mechanism is ready to aid in carrying out my improved method of forming concerete or other plastic articles. The feed screw 46 is set in motion by throwing the driven portion 51 of the clutch into engagement with the driving portion 50 thereof by manipulation of the hand lever 59 and the wheels 13 are set in motion, as by manipulation of the hand lever 31 to advance the feed mechanism on its rails 12, thereby moving the delivery end of the feed trough 45 from the near to the far extremity of the mold 11, which is being rotated by suitable spinning mechanism 10. When the feed trough has advanced to the desired distance, the hand lever 31 may be thrown to its opposite extreme position to thereby reverse the direction of movement of the wheels 13, as hereinbefore described, whereupon the truck will be returned toward its original position, thereby moving the delivery end of the feed trough 45 from the far to the near extremity of the mold 11. These alternate advance and return movements of the delivery end of the feed trough may be continued as long as desired, and, as above described, they may be controlled automatically through the medium of the trip lever 37 and suitably placed stops 39 for tripping same. When sufficient plastic material has been introduced into the mold 11, the rotation of the feed screw 46 is stopped by sliding the driven portion 51 of the clutch out of engagement with the driving portion 50. The spinning of the mold 11 serves to aid in distributing the plastic material within the mold, and hollow articles, such as concrete pipe sections, can be readily formed therein. To enable the formation of such articles of greater density, adjacent their outer peripheries, I preferably speed up the rotation of the mold 11 after the plastic material has been introduced into the mold. This serves to throw the heavier particles of the concrete mixture outwardly by centrifugal force and closely packs the plastic material with the result that a pipe section or the like having a very dense body of comparatively great strength is formed. Also, since the liquid in the plastic mix is lighter than the solid particles thereof, excess moisture is forced from the mix and collects in the open central portion of the molded article, whence it can be readily run off, as by slightly tilting the mold. During such rapid spinning it is also possible to readily remove excess material that may exude from the ends of the mold and the inner periphery of the molded article may also be smoothed by holding suitable tools against it during such rotation.

Figure 7:
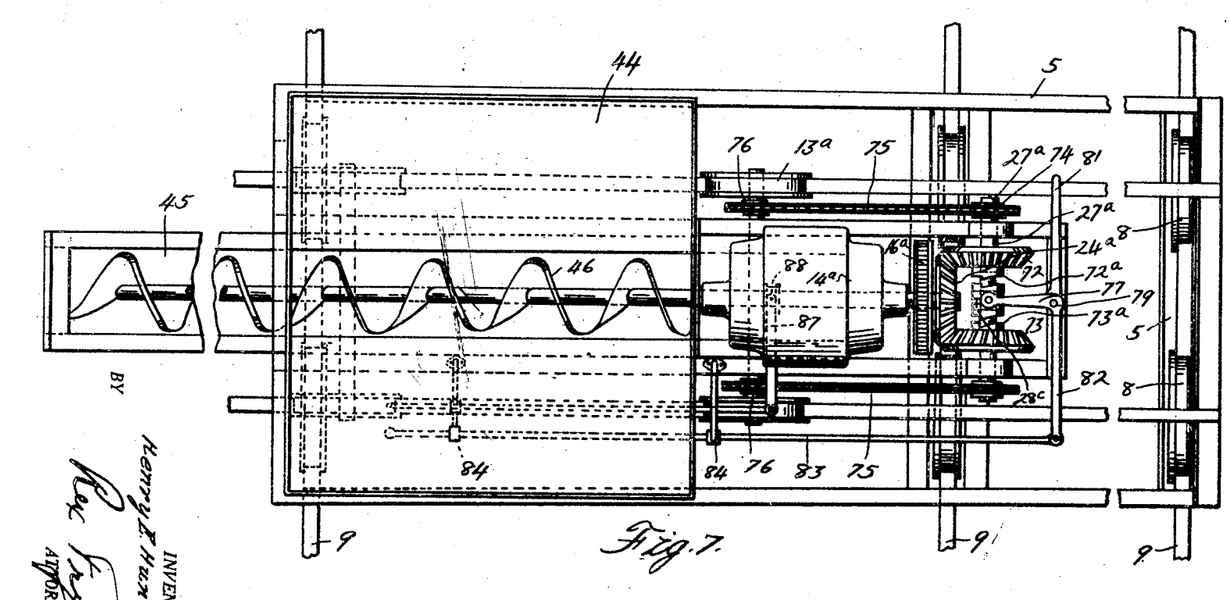
Figure 7 is a plan view of a modified embodiment of my invention.
Figure 8:
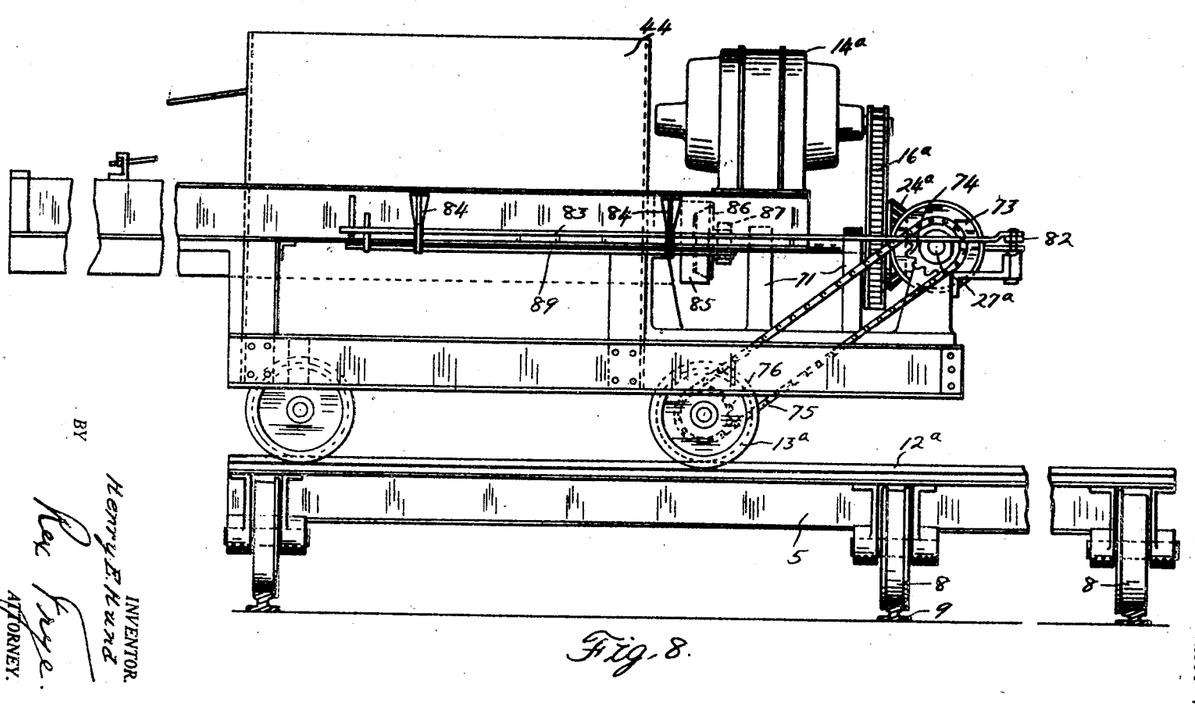
Figure 8 is a side elevation.
Figure 9:
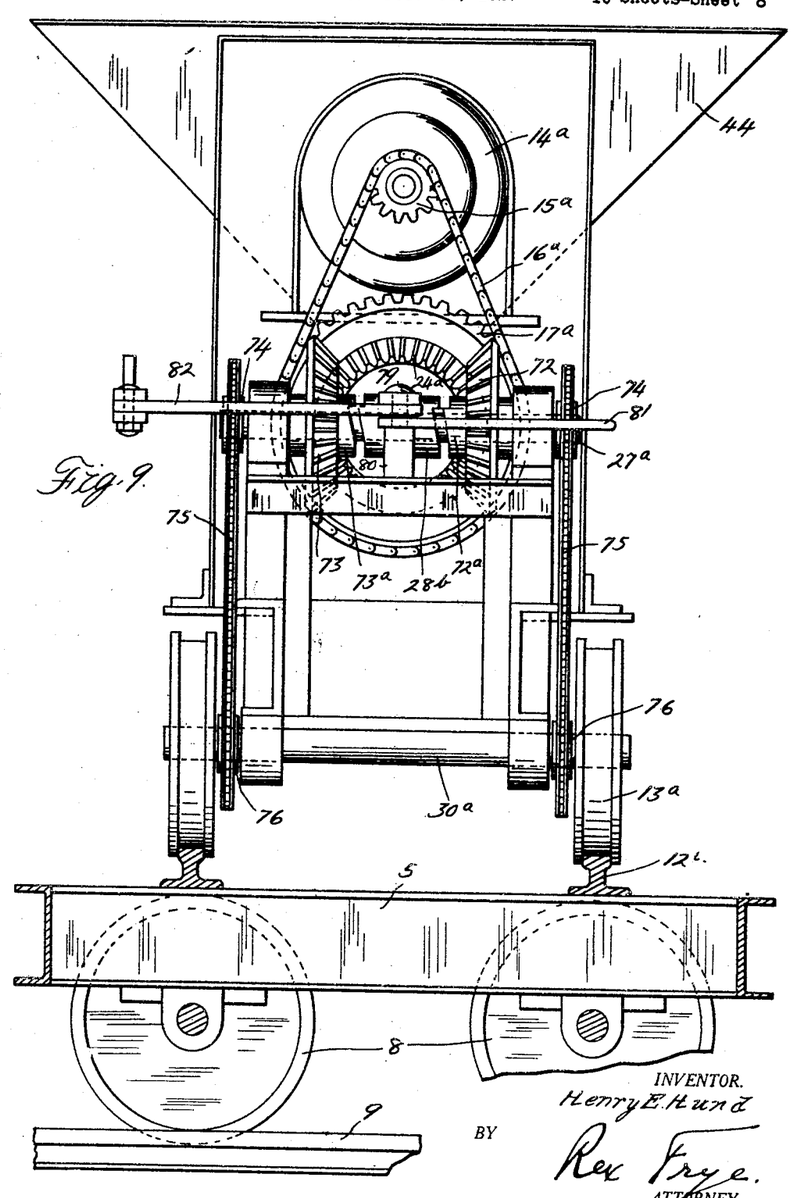
Figure 9 is a rear elevation thereof.

In Figures 7–9 is shown a slightly modified form of feed mechanism suitable for use in carrying out my improved method in which substantially the same truck 5 can be utilized on the same permanent tracks 9 for positioning the feed mechanism before any one of a series of spinning mechanisms 10 in the same manner as hereinbefore described in connection with the embodiment illustrated in Figures 1–6. On the truck 5 is mounted a pair of rails 12$^a$ for reception of the flanged wheels 13$^a$ journaled upon the framework of the feed mechanism, the rails 12$^a$ being preferably arranged at right angles to the permanent rails 9 on which the wheels 8 of the truck move. Means are provided for moving the framework of the feed mechanism, upon the rails 12$^a$ through a pair of the wheels 13$^a$ from a motor 14$^a$ mounted substantially centrally of the truck and above the clutch mechanisms upon an elevated portion of the framework of the feed mechanism. A comparatively small sprocket wheel 15$^a$ is mounted directly upon the shaft of the motor 14$^a$ and a chain 16$^a$ connects such sprocket wheel with a comparatively large sprocket wheel 17$^a$ mounted on a shaft 70 arranged substantially longitudinally of the framework and journaled in a pair of spaced brackets 71 supported upon the framework (note Figures 8 and 10). At its rear extremity the shaft 70 carries a bevel pinion 24$^a$ meshing with both of a pair of spaced bevel gears 72 and 73 so as to continuously drive them in opposite directions (note Figure 7). The bevel gears 72 and 73 are loosely journaled around a transverse shaft 27$^a$ and carry clutch faces 72$^a$ and 73$^a$ respectively for cooperation when desired with a slidable clutch member 28$^b$ splined upon the transverse shaft 27$^a$. When the slidable clutch member 28$^b$ is moved into engagement with one of the bevel gears 72 or 73 the transverse shaft 27$^a$ will be rotated to set in motion a pair of sprocket wheels 74 mounted at the extremities of the shaft 27$^a$ and connected by chains 75 with sprocket wheels 76 fixed upon the axle 30$^a$ carrying a pair of flanged wheels 13$^a$. The relative number of teeth in the sprocket wheels 74 and 76 as well as the relative number of teeth in the sprocket wheels 15$^a$ and 17$^a$ herein serve to provide desired reduction in gearing to permit the wheels 13$^a$ to be rotated at desired speeds relatively to the speed of the motor 14$^a$. When the clutch member 28$^b$ is in engagement with one clutch face, as 72$^a$ of the bevel gear 72, the wheels 13$^a$ will be rotated in one direction, and when the clutch face 28$^b$ is slid into engagement with the other clutch face 73$^a$ the wheels 13$^a$ are driven in the opposite direction.

The lever mechanism for shifting the slidable clutch member 28$^b$ into and out of engagement with the clutch faces 72$^a$ and 73$^a$ of the bevel gears comprise a yoke 77 having a pair of pins 78 at its free extremities extending into a circular slot 28$^c$ in the clutch member 28$^b$, the opposite extremities of the yoke 77 being pivoted, as upon a pin 79 extending through a bracket 80 carried by the framework (note Figure 9) and a pair of links 81 and 82 extending in opposite directions from the yoke 77 transversely of the framework of the feed mechanism. Thus the link 81 extends toward the right side of the framework and is so connected with the yoke 77 that a person at this side of the framework may slide the clutch member 28$^b$ in either direction by swinging the link 81 forwardly or rearwardly as desired, the swinging movement of the link 81 serving to oscillate the pin 79 and the yoke. The link 82 extends laterally from the yoke toward the left side of the framework and is preferably pivotally connected at its extremity to an elongated slide rod 83 mounted to slide in spaced bearings 84 fixed upon the framework (note Figures 7 and 8), whereby a person at the left of the framework may slide the clutch member 28$^b$ in either direction by merely gripping the rod 83 at any point and sliding it longitudinally of the framework in the desired direction. The sliding movement of the rod 83 serves to swing the link 82 to oscillate the pivot pin 79 and the yoke 77. By virtue of this arrangement it is possible for an operator at either side of the framework to shift the slidable clutch member 28$^b$ out of engagement with the clutch face of one bevel gear and into engagement with the clutch face of the other bevel gear, thereby serving to reverse the direction of movement of the wheels 13$^a$.

The means for supplying concrete or other plastic material to the pipe section or other article being made is substantially the same as in the embodiment illustrated in Figures 1–6, with the exception that the clutch for securing the desired rotation of the feed screw 46 whenever desired is of a different type and is arranged to be driven from the motor 14$^a$ in a different manner. In this embodiment the shaft of the feed screw 46 projecting rearwardly from the hopper 44 carries the driven member 85 of a cone clutch, the driving member 86 of which is splined for sliding movement upon and rotation with the shaft 70 on which the gear pinion 24$^a$ is also mounted, provision being made for sliding the driving member 86 of the clutch into and out of engagement with the driven member 85, as through a yoke 87 carrying pins 88 in its spaced extremities extending into a circumferential groove in the hub of the driving member 86. The opposite extremity of the yoke 87 is preferably suitably connected with a slide bar 89 mounted for sliding movement in the brackets 84 below the slide bar 83 hereinbefore described. By sliding the bar 89 in one direction, the driving member 86 is moved into engagement with the driven member 85 of the clutch, while movement of the slide bar 89 in the opposite direction will free the driving member 86 from the driven member 85.

This second described embodiment of my improved feed mechanism has certain advantages, as, for example, cheaper construction and lighter weight, but also has certain disadvantages, such as lack of fine adjustments, when compared with the first described embodiment. In both embodiments, the feeding of plastic material from the hopper 44 is from the forward extremity of the feed trough, and distribution over an extended area is effected by moving the feed trough, as by reciprocating it together with the framework of the feed mechanism by reversing the rotation of the wheels 13 or 13$^a$.

Figure 10:
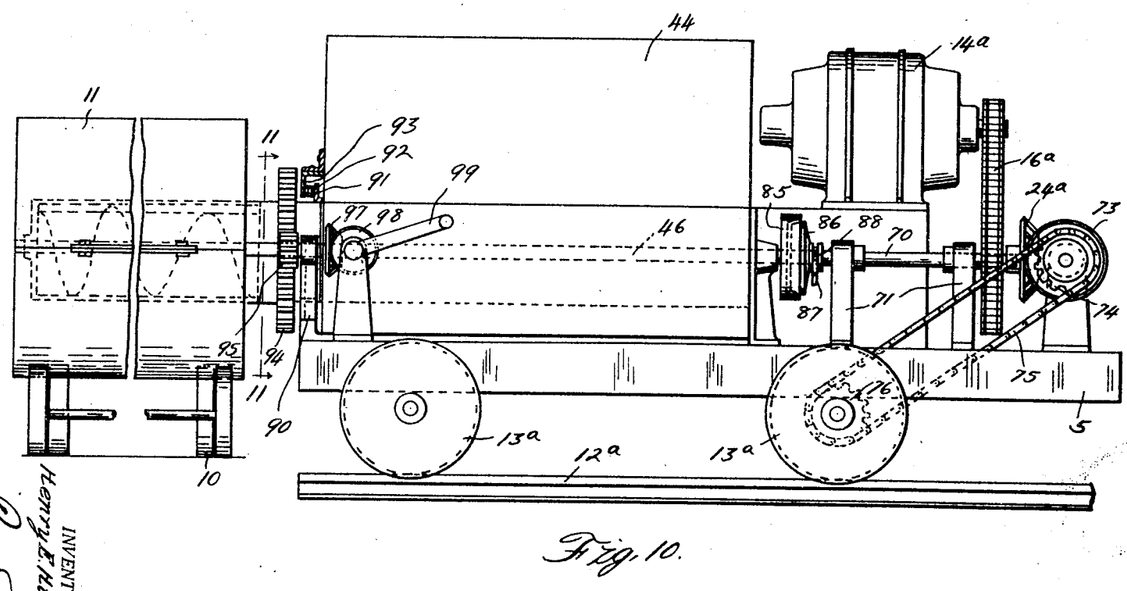
Figure 10 is a side elevation of a further embodiment of my invention wherein the feed chute can be manually rotated to dump its contents over an extended area.
Figure 11:
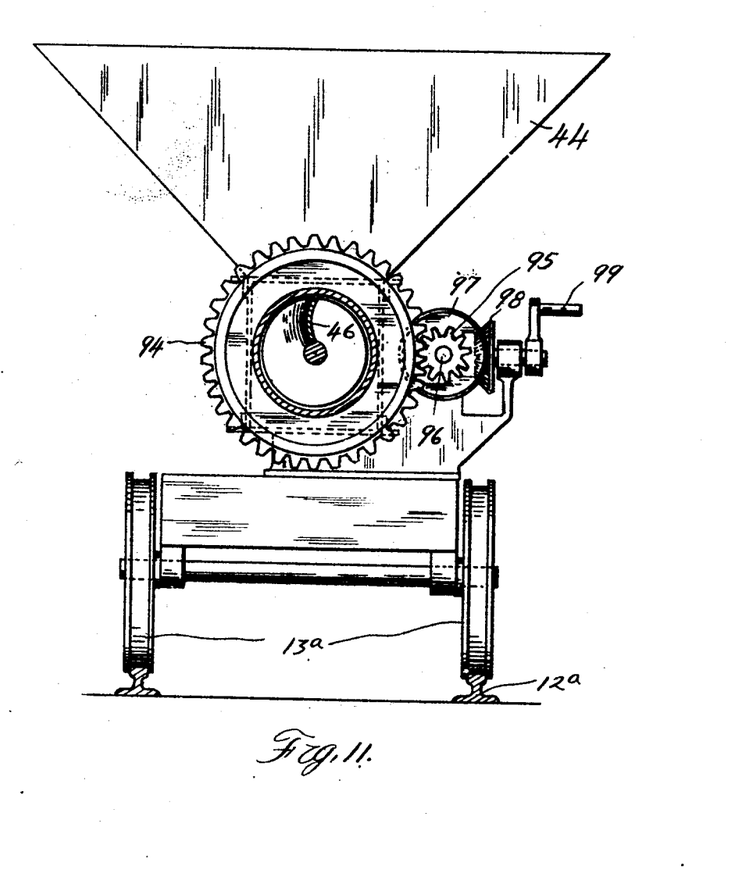
Figure 11 is a detailed cross section taken substantially on the line 11—11 of Figure 10.

In Figures 10 and 11, however, I have shown an embodiment wherein the forward extremity of the feed trough is closed, and delivery of plastic material from the hopper is effected by filling that portion of the feed trough exterior of the hopper to the desired extent and then rotating the exterior portion of the feed trough through a half revolution to dump the plastic material then therein over the desired area wherein it is to be used.

The portion of the feed trough outside of the hopper, is preferably journaled to rotate in a bracket 90 on the framework and carries adjacent the hopper a ball race member 91 engaging against a plurality of balls 92 arranged in a suitable cage, the opposite side of the balls being engaged by a race member 93 carried upon the forward face of the hopper. Also secured to the exterior portion of the feed trough is a gear wheel 94 meshing with a pinion 95 (note Figure 11) fixed on a stub shaft 96 suitably journaled in a bracket upon the framework and carrying at its opposite extremity a bevel gear 97 meshing with a bevel gear 89 arranged to be rotated from the handle 99. By virtue of this arrangement, whenever it is desired to dump the contents of that portion of the feed trough exterior of the hopper 44, it is only necessary to manually revolve the handle 99, the rotation of the handle being transmitted through bevel gears 98 and 97 to the pinion 95 and gear 94. Obviously after the feed trough has been turned through a half revolution to dump its contents, the feed trough can then be returned by opposite rotation of the handle, or can be turned through the remainder of a revolution to return the feed trough to its original position.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a device of the character described, a truck, rails mounted upon the truck, a hopper and frame work movably mounted upon the truck, a delivery chute extending from the hopper, means for moving the framework and hopper upon the truck including flanged wheels mounted on said rails and connected in pairs by axles, a spur gear wheel mounted on one of said axles, a transverse shaft mounted upon the frame work and carrying a spur gear wheel, reduction gearing arranged between said gear wheels, means for driving said transverse shaft from the motor, including clutch mechanism operable to reverse directions of rotation of said shaft comprising a pair of bevel gears mounted adjacent said shaft and carrying clutch faces, a bevel pinion meshing with both of said bevel gears to simultaneously rotate them in opposite directions, a slidable clutch splined upon the shaft and movable into engagement with either of the clutch faces of said bevel gears, means for sliding said clutch member at will, and means for positively driving said bevel pinion from the motor.

2. In a device of the character described, a truck, rails mounted upon the truck, a hopper and framework movably mounted upon the truck, a delivery chute extending from the hopper, means for moving the framework and hopper upon the truck including flanged wheels mounted on said rails and connected in pairs by axles, a gear wheel mounted on one of said axles, a transverse shaft mounted upon the framework and carrying a gear wheel, reduction gearing arranged between said gear wheels, means for driving said transverse shaft from the motor, including clutch mechanism operable to reverse directions of rotation of said shaft comprising a pair of bevel gears mounted adjacent said shaft and carrying clutch faces, a bevel pinion meshing with both of said bevel gears to simultaneously rotate them in opposite directions, a slidable clutch splined upon the shaft and movable into engagement with either of the clutch faces of said bevel gears, means for sliding said clutch member at will, including a yoke operably connected with the clutch member and pivoted upon the framework, a control lever mounted upon the framework, linkage connections between the yoke and control lever, and means for gear-connecting the bevel pinion with the motor.

3. In a device of the character described, a truck, rails mounted upon the truck, a hopper and framework movably mounted upon the truck, a delivery chute extending from the hopper, means for moving the framework and hopper upon the truck including flanged wheels mounted on said rails and connected in pairs by axles, a gear wheel mounted on one of said axles, a transverse shaft mounted upon the framework and carrying a gear wheel, reduction gearing arranged between said gear wheels, means for driving said transverse shaft from the motor, including clutch mechanism operable to reverse directions of rotation of said shaft comprising a pair of bevel gears mounted adjacent said shaft and carrying clutch faces, a bevel pinion meshing with both of said bevel gears to simultaneously rotate them in opposite directions, a slidable clutch splined upon the shaft and movable into engagement with either of the clutch faces of said bevel gears, means for sliding said clutch member at will, including a yoke operably connected with the clutch member and pivoted upon the framework, a control lever mounted upon the framework, linkage connections between the yoke and control lever, and stops arranged upon the truck for swinging the control lever upon movement of the framework upon the truck for predetermined distances in either direction.

4. In a device of the character described, a truck having rails thereon, a hopper and framework mounted for movement upon the truck and carrying pairs of wheels engaging said rails, a motor mounted upon the framework, means arranged between the motor and wheels for rotating said wheels including clutch mechanism arranged to control the direction of rotation of said wheels, manual control means for operating said clutch and automatic control means for also operating said clutch including stops mounted upon said truck.

5. In a device of the character described, a truck having rails thereon, a hopper and framework mounted for movement upon the truck and carrying pairs of wheels engaging said rails, a motor mounted upon the framework, means arranged between the motor and wheels for rotating said wheels including clutch mechanism arranged to control the direction of rotation of said wheels, remote control mechanism mounted upon the framework for operating said clutch at will, a feed trough extending from the hopper, a worm feed extending through the trough and hopper, and means for rotating the worm feed from said motor including clutch mechanism, and remote control means mounted upon the framework for operating the last-mentioned clutch mechanism.

6. In a device of the character described, a truck having rails thereon, a hopper and framework mounted for movement upon the truck and carrying pairs of wheels engaging said rails, a motor mounted upon the framework, means arranged between the motor and wheels for rotating said wheels including clutch mechanism arranged to control the direction of rotation of said wheels, manually operated clutch control mechanism mounted upon the framework, automatic clutch control mechanism mounted upon the framework and truck, a feed trough extending from the hopper, a worm feed extending through the hopper and into the trough, and means for intermittently rotating the worm feed from the motor, including clutch mechanism, and manually operated control means for operating the last mentioned clutch mechanism and extending into juxtaposition to the manually operated means for controlling the first mentioned clutch mechanism.

7. In a device of the character described, a truck having rails thereon, a hopper and framework mounted for movement upon the truck and carrying pairs of wheels engaging said rails, a motor mounted upon the framework, means arranged between the motor and wheels for rotating said wheels, including clutch mechanism arranged to control the direction of rotation of said wheels, manually operated clutch control mechanism mounted upon the framework, automatic clutch control mechanism mounted upon the framework and truck, a feed trough extending from the hopper, a worm feed extending through the hopper and into the trough, and means for intermittently rotating the worm feed from the motor, including clutch mechanism, manually operated control means for operating the last mentioned clutch mechanism and extending into juxtaposition to the manually operated means for controlling the first mentioned clutch mechanism, and means for rotatively moving the trough exteriorly of said worm feed.

8. In a device of the character described, a truck having rails thereon, a hopper and framework mounted for movement upon the truck and carrying pairs of wheels engaging said rails, a motor mounted upon the framework, a variable speed transmission mechanism having a plurality of spaced shafts also mounted upon the framework, means for directly driving one of said shafts from the motor, means for rotating said wheels driven from the same shaft of the transmission mechanism as is directly connected with the motor, a feed trough extending from the hopper, a worm feed extending through the hopper and into the trough, and means for rotating the worm feed driven from a second shaft of said transmission mechanism.

9. In a device of the character described, a truck having rails thereon, a hopper and framework mounted for movement upon the truck and carrying pairs of wheels engaging said rails, a motor mounted upon the framework, a variable speed transmission mechanism having a plurality of spaced shafts also mounted upon the framework, means for directly driving one of said shafts from the motor, means for rotating said wheels driven from the same shaft of the transmission mechanism as is directly connected with the motor, a feed trough extending from the hopper, a worm feed extending through the hopper and into the trough, means for rotating the worm feed driven from a second shaft of said transmission mechanism, separate clutch mechanisms arranged for controlling the rotation of said wheels and worm feed from said transmission mechanism, and separate manually operated control means for each of said clutch mechanisms, including levers mounted upon said framework in juxtaposition to each other.

10. In a device of the character described, a truck having rails thereon, a hopper and framework mounted for movement upon the truck and carrying pairs of wheels engaging said rails, a motor mounted upon the framework, a variable speed transmission mechanism having a plurality of spaced shafts also mounted upon the framework, means for directly driving one of said shafts from the motor, means for rotating said wheels driven from the same shaft of the transmission mechanism as is directly connected with the motor, a feed trough extending from the hopper, a worm feed extending through the hopper and into the trough, means for rotating the worm feed driven from a second shaft of said transmission mechanism, separate clutch mechanisms arranged for controlling the rotation of said wheels and worm feed from said transmission mechanism, separate manually operated control means for each of said clutch mechanisms, including levers mounted upon said framework in juxtaposition to each other, and automatic clutch control mechanism mounted upon the framework and truck for clutch-controlling the rotation of said wheels.

11. In a device of the character described, a truck having rails thereon, a hopper and framework mounted for movement upon the truck and carrying pairs of wheels engaging said rails, a motor mounted upon the framework, a feed trough extending forwardly of the hopper and mounted for rotative movement relatively to the hopper, a worm feed extending through the hopper and into the trough, means for intermittently rotating the worm feed from the motor, and means for rotatively moving the trough exteriorly of the worm feed.

In witness whereof I hereunto set my hand.

HENRY E. HUND.